United States Patent
Verma et al.

(10) Patent No.: US 10,977,711 B1
(45) Date of Patent: Apr. 13, 2021

(54) ARTIFICIAL INTELLIGENCE SYSTEM WITH HIERARCHICAL MACHINE LEARNING FOR INTERACTION SESSION OPTIMIZATION

(71) Applicant: Amazon Technologies, Inc., Seattle, WA (US)

(72) Inventors: Prashant Verma, Seattle, WA (US); Anoop Balakrishnan, Seattle, WA (US); Janick M. Bernet, London (GB)

(73) Assignee: Amazon Technologies, Inc., Seattle, WA (US)

( * ) Notice: Subject to any disclaimer, the term of this patent is extended or adjusted under 35 U.S.C. 154(b) by 460 days.

(21) Appl. No.: 15/861,496

(22) Filed: Jan. 3, 2018

(51) Int. Cl.
| | |
|---|---|
| *G06Q 30/00* | (2012.01) |
| *G06Q 30/06* | (2012.01) |
| *G06K 9/62* | (2006.01) |
| *G06Q 30/02* | (2012.01) |
| *G06N 20/00* | (2019.01) |

(52) U.S. Cl.
CPC ....... *G06Q 30/0631* (2013.01); *G06K 9/6219* (2013.01); *G06N 20/00* (2019.01); *G06Q 30/0253* (2013.01)

(58) Field of Classification Search
None
See application file for complete search history.

(56) References Cited

U.S. PATENT DOCUMENTS

| | | |
|---|---|---|
| 7,542,951 B1 | 6/2009 | Chakrabarti et al. |
| 7,584,159 B1 | 9/2009 | Chakrabarti et al. |
| 7,668,821 B1 | 2/2010 | Donsbach et al. |
| 8,090,621 B1 | 7/2012 | Chakrabarti et al. |
| 8,301,623 B2 | 10/2012 | Chakrabarti et al. |
| 8,452,797 B1 | 5/2013 | Paleja et al. |
| 8,468,164 B1 | 6/2013 | Paleja et al. |
| 8,510,247 B1 | 8/2013 | Kane, Jr. et al. |
| 2002/0010625 A1* | 1/2002 | Smith ............... G06Q 30/0631 705/14.52 |
| 2007/0204308 A1* | 8/2007 | Nicholas ............. H04N 21/222 725/86 |
| 2007/0282811 A1 | 12/2007 | Musgrove |
| 2008/0140643 A1 | 6/2008 | Ismalon |
| 2010/0146012 A1 | 6/2010 | Beaudreau et al. |
| 2017/0109807 A1* | 4/2017 | Krishnan ........... G06Q 30/0253 |

(Continued)

OTHER PUBLICATIONS

U.S. Appl. No. 15/831,008, filed Dec. 4, 2017, Gyuri Szarvas et al.

(Continued)

*Primary Examiner* — Mila Airapetian
(74) *Attorney, Agent, or Firm* — Robert C. Kowert; Kowert, Hood, Munyon, Rankin & Goetzel, P.C.

(57) ABSTRACT

An intermediate result set is obtained from a first machine learning model whose input data set comprises values of a first set of properties associated with a session of operations. The intermediate result and a second set of properties associated with the session are provided as input to a second machine learning model. A value of at least one property of the first set is determined before a value of at least one property of the second set is determined. A particular action recommendation, based at least in part on output generated by the second machine learning model, is implemented.

20 Claims, 11 Drawing Sheets

(56) References Cited

U.S. PATENT DOCUMENTS

2019/0043115 A1* 2/2019 Purves ............... G06F 16/22

OTHER PUBLICATIONS

U.S. Appl. No. 15/914,923, filed Mar. 7, 2018, Giovanni Zappella.
U.S. Appl. No. 15/796,410, filed Oct. 27, 2017, Benjamin Lev Snyder et al.
Karol Gregor, et al., "DRAW: A Recurrent Neural Network for Image Generation", Proceedings of the 32nd nlemalional Conference on Machine Learning; JMLR: W & CP, vol. 37, pp. 1-10.
Zachary C. Lipton, et al., "Generative Concalenalive Nels Jointly Learn to Write and Classify Reviews", arXivprepring arXiv: 1511.03683, pp. 1-11.
Wikipedia, "Multi-armed bandit", Retrieved from URL: https://en.wikipedia.org/wiki/Multiarmed_bandil on Jul. 11, 2017, pp. 1-13.
Diederik P. Kingma and Jimmy Lei Ba, "ADAM: A Method for Stochastic Optimization," Published as a conference paper at ICLR 2015, Jul. 23, 2015, pp. 1-15.
David Bamman, Ted Underwood and Noah A. Smith, "A Bayesian Mixed Effects Model of Literary Character," Proceedings of the 52nd Annual Meeting of the Association for Computational Linguistics, pp. 370-379, Baltimore, Maryland, USA, Jun. 23-25, 2014. c2014 Association for Computational Linguistics.
David Bamman, Brendan O'Connor and Noah A. Smith, "Learning Latent Personas of Film Characters," Proceedings of the 51st Annual Meeting of the Association for Computational Linguistics, pp. 352-361, Sofia, Bulgaria, Aug. 1-9, 2013. c2013 Association for Computational Linguistics.
David Bamman and Noah A. Smith, "Unsupervised Discovery of Biographical Structure from Text," http://dumps.wikimedia.org/enwiki/20140102/enwiki-20140102-pages-articles.xml.bz2, 2014, pp. 1-13.
Micha Elsner, "Character-based Kernels for Novelistic Plot Structure," Proceedings of the 13th Conference of the European Chapter of the Association for Computational Linguistics, pp. 634-644, Avignon, France, Apr. 23-27, 2012. c2012 Association for Computational Linguistics.
Varoslav Ganin and Victor Lempitsky, "Unsupervised Domain Adaptation by Backpropagation," Proceedings of the 32nd International Conference on Machine Learning, Lille, France, 2015. JMLR: W&CP vol. 37. Copyright 2015 by the author(s), pp. 1-10.
Jeffrey Pennington, Richard Socher and Christopher D. Manning, "GloVe: Global Vectors for Word Representation," Oct. 25, 2014, pp. 1-12.
Mohit Iyyer, Anupam Guha, Snigdha Chaturvedi, Jordan Boyd-Graber, and Hal Daum•e 111, "Feuding Families and Former Friends: Unsupervised Learning for Dynamic Fictional Relationships," 2016, pp. 10-11.
David M. Blei, Department of Computer Science Princeton University"Probabilistic Topic Models," Aug. 22, 2011, pp. 1-176.
Yoav Goldberg, "A Primer on Neural Network Models for Natural Language Processing," Draft as of Oct. 5, 2015, Journal of Artificial Intelligence Research 57 (2016) pp. 345-420.
Diego Marcheggiani and Ivan Titov, "Discrete-State Variational Autoencoders for Joint Discovery and Factorization of Relations," Transactions of the Association for Computational Linguistics, vol. 4, pp. 231-244, 2016. Action Editor: Sebastian Riedel Submission batch: Oct. 2015; Revision batch: Feb. 2016; Published Jun. 2016. 2016 Association for Computational Linguistics. Distributed under a CC-BY 4.0 license.
Who are you shopping for?, downloaded from https://www.amazon.com/gp/gifl-finder?ageGroup=adult-neutral&showBubbles=true on Aug. 13, 2017, pp. 1-6.
AWS, "Amazon Machine Learning Developer Guide Version Latest", Copyright 2017 Amazon Web Services, pp. 1-146.

* cited by examiner

ARTIFICIAL INTELLIGENCE SYSTEM WITH HIERARCHICAL MACHINE LEARNING FOR INTERACTION SESSION OPTIMIZATION

BACKGROUND

In recent years, as the costs of collecting and storing data has decreased, machine learning algorithms that analyze collected data sets for various types of predictions are being increasingly employed to increase the effectiveness of various services and applications. Large amounts of data with respect to user interactions with network-accessible applications (such as e-retail applications) may be collected, for example using logs generated at the applications, and used to enhance usability or customize user experiences with the applications. Similarly, data collected from numerous sensors may be analyzed to improve the functionality of various devices and algorithms, including algorithms for enhancing security, predicting failures, and so on.

As machine learning models have become more sophisticated, the sizes and complexity of the input observations—e.g., the total number of variables for which respective values are collected for a given example observation to be used to train a model—have also increased. Input observation examples with hundreds or thousands of variables are becoming commonplace.

Depending on the application for which machine learning models are being used, the amount of time and resources available for executing the models may vary. For example, in a scenario where machine learning models are used to manage inventories for time periods which are a number of weeks or months in the future, a large amount of time may be available for model execution, and models with feature vectors with thousands of elements may be used without much difficulty. However, some decisions reached using machine learning-based methodologies may have to be made relatively quickly—e.g., within at most a few hundreds of milliseconds for some types of information presentation decisions associated with a potential customer browsing an e-retail web site, or when quick response actions have to be taken based on the results of monitoring a mission-critical system. Handling tradeoffs between model input complexity and time/resource constraints may present a non-trivial technical challenge.

Figure 1:
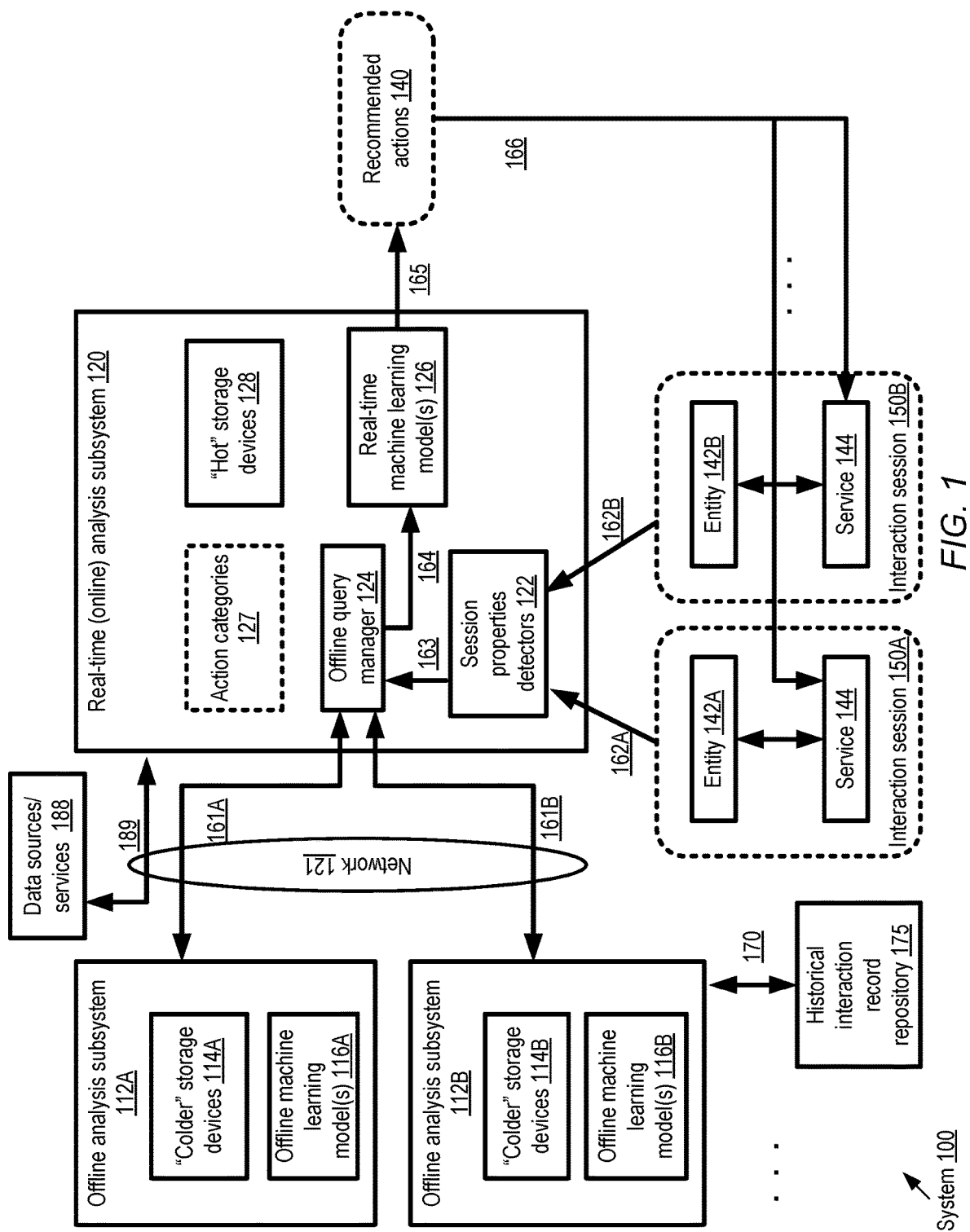
FIG. 1 illustrates an example system environment in which a hierarchy of machine learning models may be used to identify actions to be taken with respect to service interaction sessions, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for utilizing a hierarchy of machine learning models, e.g., for applications in which actions based on machine learning results have to be taken under relatively stringent resource or time constraints for one or more stages of an interaction session, are described. Such techniques may be used in at least some embodiments, for example, to rapidly select information to be presented to potential item consumers as they navigate an e-retail web site, to pre-load targeted web page content, to respond in real time to system monitoring events, and so on. The terms "input variable" or "variable" may be used with respect to various embodiments to refer to either raw input data whose analysis may be helpful in generating machine learning results, or to features that are obtained by processing or transforming the raw input data into a form that is better suited for consumption by machine learning models.

At a high level, the hierarchical approach towards machine learning may be summarized as follows. A potentially high-dimensional space of input variables (which could comprise, for example, thousands of variables for some complex problem domains) for machine learning for a given application may be logically subdivided into at least two sub-categories in some embodiments: an offline category and an online or real-time category. The offline category may comprise variables whose values may be ascertained at an earlier point in time than the values of the variables of the real-time category. For example, if a machine learning based decision is to be made at some time $t_d$, those variables whose values can be obtained no later than $(t_d\text{-delta}_{off})$ (where $\text{delta}_{off}$ may be application dependent) may be considered offline variables. The remaining variables, whose values can only be ascertained within the interval $(t_d\text{-delta}_{off}, t_d)$ may be considered real-time variables. In at least some embodiments, a number of input data examples (comprising all the input variables) may be analyzed to determine how early, within a given session, values of the different input variables may be ascertained, and the results of this analysis may be used to identify the offline and real-time subsets of variables.

Instead of using a single large machine learning model to which all the input variables are provided, the task of making machine learning predictions may be partitioned in at least some embodiments. One or more offline data-based machine learning models, to which respective subsets of the offline category of input variable with respect to a given observation record are provided, may be used to obtain respective concise intermediate predictions in such embodiments. For example, one numeric or categorical value (or a small number of such values or scores) may be obtained from each such offline model in some embodiments. Then, the concise intermediate results may be combined with the real-time variables to form the input for a real-time machine learning model, whose results or output may be used to identify a recommended action, customized for the observation being processed, to be performed. By splitting up the machine learning workload in this manner instead of using a single large model, in effect the dimensionality of the input space may be reduced for the set of machine learning computations to be performed just before the results have to be obtained. As a result, in various embodiments, considerable efficiencies may be achieved with respect to the amount of computational power, storage, and/or network traffic needed for the machine learning portion of the application. In addition, in at least some embodiments, the offline models may be developed and trained by respective groups of one or more subject matter experts in respective sub-domains represented by the subsets of the offline category of variables, which may lead to a higher quality of models and/or an overall increase in model development and execution efficiency than if a single large model were to be used. In at least some embodiments, several of the models may be trained in parallel, thereby reducing the overall training time.

According to at least some embodiments, the hierarchical machine learning methodology summarized above may be used in applications involving optimized presentation of information during interaction sessions of entities (such as potential or actual item consumers) with one or more network-accessible services (such as a web site of an e-retailer with an inventory comprising numerous items). In one such embodiment, respective values of a first set of properties of an interaction session of a given entity with a service may be obtained, e.g., by a session properties detector of a real-time analysis subsystem associated with the service. This first set of properties may in some cases comprise at least one property which remains unchanged during the interaction session (such as the identity of the entity, the location or network address from which the session was initiated, and so on). The first set of properties may represent an offline set of input variables in various embodiments, to be consumed by one or more offline machine learning models of respective offline analysis subsystems. In some embodiments, an initial offline variable value (such as the identity of an item consumer interacting with an e-retail site) may be used to obtain other offline variable values (such as records of earlier interactions of that item consumer with the e-retail site.)

In at least some embodiments, respective network messages or queries may be transmitted, e.g., from the real-time analysis subsystem, to one or more offline analysis subsystems. A given message or query may comprise the values of at least some of the first set of properties (the offline variables). The response generated to such a message or query at a given offline analysis subsystem may comprise an intermediate result, e.g., a prediction pertaining to at least one stage of an interaction session such as (in the case of an e-retail interaction session) whether the potential item customer is likely to access a particular web page or buy a particular item. At the real-time analysis subsystem, in various embodiments, intermediate results obtained from the offline analysis subsystems may be combined with a second set of properties of the interaction session and provided as input to another machine learning model. The second set of properties may, for example, represent one or more real-time variables, and may in some cases include a record of an occurrence of one or more events in the interaction session (such as, in the e-retail scenario, a record indicating that the potential item consumer has placed an item in a shopping cart or wish list, a record indicating the total price of all the items places in the shopping cart, or records of the last N web pages visited). Based at least in part on the output generated by the machine learning model of the real-time analysis subsystem, one or more recommended actions may be performed in various embodiments—e.g., a particular promotional offer may be displayed to an e-retail item consumer.

Any of wide variety of machine learning models and algorithms may be used at the offline and real-time analysis subsystems. For example, regression models, decision-tree based models (such as Random Forest models), neural-network based models, time-series models and the like may be used singly or in combination at either subsystem in various embodiments. A multi-layer hierarchy of models may be used in some embodiments, in which for example intermediate output produced at a first set of offline analysis subsystems is provided as input to a second set of intermediary analysis subsystems, and output produced by the intermediary analysis subsystems is combined with real-time variables for use as input for the machine learning models of a real-time analysis subsystem.

In a scenario in which hierarchical machine learning is used to optimize information presented to an item consumer navigating a web site of an e-retail service which provides access to numerous items during a given shopping or browsing session, any combination of a variety of actions may be taken based on the results produced at the real-time analysis subsystem. Such actions may include, for example, presenting a promotional offer on a checkout page, presenting an advertisement for a particular item or pre-loading targeted content to be displayed on one or more web pages.

In the e-retail scenario, in some embodiments the offline variables or properties of the session may include, among others, an indication of an identity of an individual participating in the session, an indication of location information of an individual participating in the session, information indicating than the entity is a member of a preferred group of entities (such as a preferred customer category), or one or more records of previous interactions of the entity with the service. In some embodiments, the information provided to an offline analysis subsystem in a query may be used to obtain additional information pertaining to the session—e.g., if the real-time analysis subsystem provides an indication of the identity of an e-retail consumer participating in the session, an offline analysis subsystem may use the identity information to query a repository of historical records of other interactions of the consumer with the service or with other services, and may use the historical records as part of the input for an offline model. The set of real-time variables included in the input to the machine learning model of the real-time analysis subsystem in an e-retailing scenario may include, for example, an indication of an insertion of an item into a shopping cart, an insertion of an item into a wish list, or a navigation to a particular portion of a web site during some stage of the session in various embodiments.

Hierarchical machine learning techniques similar to those described above may be used in various embodiments for applications that are not necessarily related to e-retailing. For example, in one embodiment, the techniques may be used to generate real-time responses to various types of monitored events. The offline properties or variables associated with a monitored system may include, for example, records of typical workload patterns during the course of some selected time interval (such as average workload levels measured during each five-minute period of some number of recent weeks), and the intermediate results generated at an offline analysis subsystem may comprise a workload level prediction. The real-time properties or variables may include dynamically collected metrics or event records obtained using one or more tools at the monitored system in such embodiments. Based on output produced by a real-time machine learning model to which the combination of the real-time metrics and the intermediate result are provided as input, an action such as increasing or reducing a resource capacity may be recommended in some embodiments.

In at least one embodiment, results produced at various levels of the hierarchy may be exposed via programmatic interfaces to interested parties. For example, the intermediate results produced at the offline analysis subsystems and/or the final results generated at the real-time analysis subsystem may be accessed in some embodiments via a programmatic interface such as a web-based console, an application programming interface (API), a command-line tool, and/or a graphical user interface.

In at least one embodiment, the hierarchical machine learning methodology described above may be implemented at least in part using resources of a provider network or public cloud environment. For example, a machine learning service implemented at a provider network may enable clients to configure offline and real-time models in desired hierarchies. In at least one embodiment, some parts of the hierarchy (e.g., one or more offline models) may be implemented at a provider network, while other parts (e.g., a real-time model) may be implemented at external networks.

Example System Environment

FIG. 1 illustrates an example system environment in which a hierarchy of machine learning models may be used to identify actions to be taken with respect to service interaction sessions, according to at least some embodiments. As shown, system 100 may comprise resources (e.g., a respective set of computing devices) and artifacts of a plurality of subsystems, including a real-time analysis subsystem 120 and offline analysis subsystems 112A and 112B in some embodiments. The real-time analysis subsystem may also be referred to as on online analysis subsystem in some embodiments. In various embodiments, a given offline analysis subsystem 112 may comprise, among other resources, a set of storage devices 114 (e.g., 114A and 114B at subsystems 112A and 112B respectively) and one or more offline machine learning models 116 (e.g., models 116A and 116B). Similarly, the real-time analysis subsystem may comprise a local set of storage devices 128, and one or more real-time machine learning models 126. The storage of the real-time analysis subsystem may be referred to as "hot" storage relative to "colder" storage at the offline analysis subsystems in the depicted embodiment, e.g., because the per-storage-unit costs associated with the storage at the real-time analysis subsystem may be higher than the corresponding costs associated with the storage at the offline analysis subsystems (which in turn may be related to more stringent performance requirements of the real-time subsystem in some cases). It is noted that the terms "offline", when used to refer to an analysis subsystem or a machine learning model in various embodiments, is used primarily to distinguish the kind of input data analyzed at the subsystem relative to the kind of data analyzed at a real-time subsystem, and is not intended to suggest that the devices or models of the offline subsystem are disconnected from a network, or are somehow less than fully operational. For example, in the depicted embodiment, at least some of the input data analyzed at an offline subsystem 112 may have been collected or obtained at a time earlier than the time at which data has to be analyzed at the real-time or online subsystem 120. The two types of subsystems may be linked via a network 121 in various embodiments.

The combination of the offline and real-time analysis subsystems may be used to optimize various aspects of interaction sessions 150 between entities and one or more network-accessible services in the depicted embodiment. For example, the kinds of promotional information to be presented to a potential e-retail consumer at a checkout page of an e-retail web site may be selected using the results of the machine learning models 116 and 126 in some embodiments. In the depicted embodiment, two interaction sessions are shown by way of example: session 150A involving interactions of an entity 142A with a service 144, and session 150B involving interactions of an entity 142B with service 144. In some embodiments, interaction sessions between entities and multiple network-accessible services may be optimized using a given hierarchy of offline and real-time analysis subsystems and models—that is, different services 144 may be accessed in the optimized sessions.

Respective values of a first set of properties of a particular interaction session 150 may be obtained, e.g., by session property extractors 122 in the depicted embodiment, as indicated by arrows 162A and 162B. The first set may in some cases include at least one property (such as the identity of the entity 142 involved in the session) which remains unchanged during the interaction session, although such an absence of change in the properties during the session may not be required. The session properties detectors 122 may, for example, examine the network messages transmitted by an entity 142 to a service 144, which may include the entity's login information, some indication of where the requests are submitted from, and so on. In some embodiments, the network packets corresponding to the session requests may be analyzed, e.g., to identify an IP (Internet Protocol) address from which the request was submitted, and the IP address may be mapped to an approximate physical location, either at the real-time analysis subsystem 120 or to the offline analysis subsystem 112 (to which the IP address may be provided from the real-time analysis subsystem).

The initial set of session properties may be provided to an offline query manager 124 in the depicted embodiment. The offline query manager 124 may transmit one or more communications or queries to respective offline analysis subsystems 112, as indicated by arrows 161A and 161B, containing values of respective subsets of the session properties which can be used as input for trained offline models 116, and implicitly or explicitly requesting corresponding intermediate machine learning results. The offline models 116, such as 116A or 116B may have been trained to generate concise intermediate results or predictions pertaining to at least some stages of the interaction sessions 150 in various embodiments—e.g., a score representing the probability that a particular web page will be navigated to by an entity 142 may be generated as an intermediate result, or a score indicating the probability that an entity 142 will purchase a given item of an e-retailer's inventory may be generated. In at least some embodiments, the size of the intermediate result generated by a given offline model may be quite small—e.g., a single numeric score or category identifier may be generated by such a model. In at least one embodiment, a given offline analysis subsystem may utilize some of the information it receives from the query manager 124 to obtain additional information pertaining to the entity 142 or the session 150 for which intermediate results are to be generated, e.g., from a historical interaction record repository 175 which may store the history of previous interactions of the entity 142 with the service 144. The storage devices 114 may be used to store the input data for models 116, persistent versions of the models 116 themselves, cached historical records from repository 175, and so on.

The concise intermediate results may be transmitted back to the real-time analysis subsystem via network 121 in the depicted embodiment in response to the received communication or query, and may in some cases be stored at least temporarily at the storage devices 128. The concise intermediate results may be combined with a second set of properties of an interaction session (which may also be obtained by session properties detectors 122) and provided collectively as input to the real-time machine learning model(s) 126 in the depicted embodiment. The second set of properties of the session may represent real-time input variables, whose values may not have been available until very shortly before the real-time models have to be executed in various embodiments. Such real-time variable may include, for example, the final accumulated value of items added to a shopping card, the last few web pages browsed before an e-retail consumer checks out and ends their shopping session, and so on. In at least one embodiment, as indicated by arrow 189, one or more data sources or services 188 may be invoked or consulted from the real-time analysis subsystem, e.g., to obtain additional information that is to be used as input to the real-time model(s) 126, or to interpret intermediate results obtained from an offline analysis subsystem. For example, in an e-retail session optimization scenario, an identifier of an item placed in a shopping cart during the session may be mapped to an item category identifier by invoking an application programming interface of a service 188, and the item category identifier may be included in the inputs provided to a real-time model.

The real-time machine learning model(s) 126 may have been trained to generate output values or scores that can be used to identify recommendations for a variety of optimization-related actions belonging to one or more action categories 127 in the depicted embodiment. In some embodiment, respective real-time models may be used for each category of actions. The output produced by executing a real-time machine learning model 126 with the input records comprising the combination of real-time variable values and intermediate results of offline models 116 may determine a recommended action 140 to be taken with respect to a given session 150, as indicated by arrow 165. The actions may then be caused to be implemented at the appropriate service being used for the session, as indicated by arrow 166 in the depicted embodiment. Actions in the case of an e-retailing session may comprise, for example, displays of targeted advertisements or offers via a checkout page just before the interaction session ends, or pre-loading of contents of a web page predicted to have a high probability of being accessed by the entity 142, and so on.

By using the hierarchical approach illustrated in FIG. 1, the total amount of hot storage that has to be maintained for the real-time analysis may be reduced in some embodiments (e.g., relative to then storage that may have been needed if part of the workload had not been diverted to the offline analysis subsystems), and/or the amount of traffic experienced at network 121 may be reduced. In addition, compared to a scenario in which a single large model is used, the hierarchical approach may simplify the training of the real-time machine learning models 126 and the offline models 116, potentially resulting in faster and less-error prone model training and execution. Respective sets of subject matter experts may design the offline models 116 for different sub-domains of the input space, potentially leading to a cleaner separation of responsibilities, and a higher quality of model predictions, than if a single large model were used. The user experience of the entities 142 during their interactions with the service 144 may also be enhanced in some embodiments due to faster responses from the service.

Any of a wide variety of model types and algorithms may be used in different embodiments for either types of subsystem, such as regression models, neural network-based models, time series models, or decision tree based models. In at least one embodiment, the amount of computation resources available at the real-time analysis subsystem may be smaller than the amount of computation resource available at one or more of the offline analysis subsystems; as a result, a real-time model may be designed to be more resource-efficient than an offline model.

In at least one embodiment, an offline analysis subsystem and/or the real-time analysis subsystem may implement a set of programmatic interfaces which may be used to obtain the results generated at the subsystem and/or to examine other aspects of the functionality of the subsystem (e.g., for debugging purposes, or to help explain the recommended actions identified using the subsystems). For example, in one embodiment, the offline and/or real-time analysis subsystems may be implemented using resources of a provider network or public cloud environment, and programmatic interfaces (such as web-based consoles, application programming interfaces, command-line tools, and/or graphical user interfaces) supported by one or more network-accessible services of the provider network may be used to expose the intermediate and/or final results or allow clients to examine other aspects of the subsystems. The components of the various subsystems shown in FIG. 1 may be implemented at one or more computing devices in various embodiments—e.g., the session properties detectors 122 and the offline query manager 124 may be implemented collectively at one computing device, or even as part of the same operating system process, in some embodiments, and at different computing devices or processes in other embodiments.

Partitioning of Input Variables for Offline and Online Models

Figure 2:
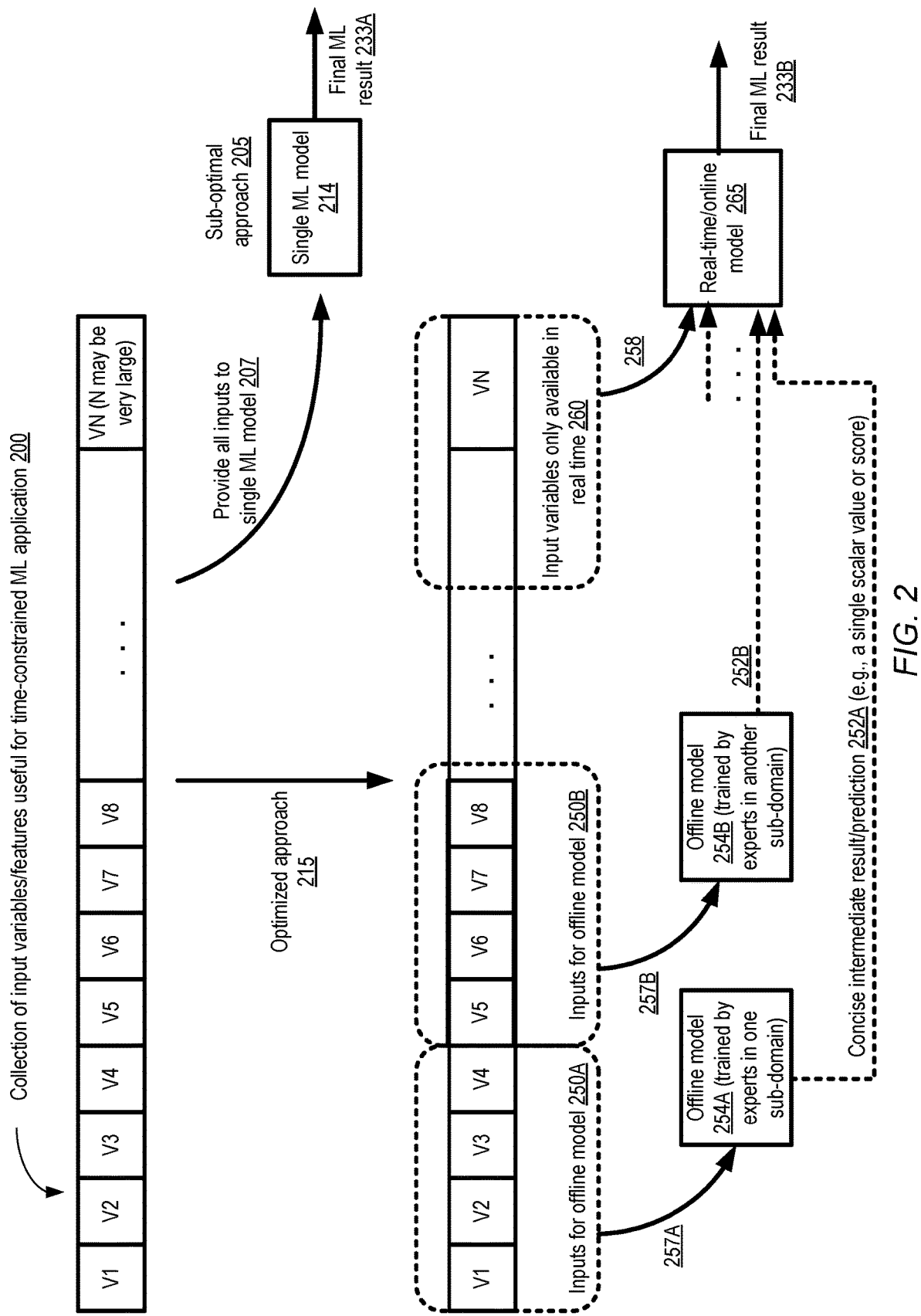
FIG. 2 illustrates an example partitioning of a high-dimensional input variable collection into subsets to be used for a plurality of machine learning models configured as a hierarchy, according to at least some embodiments.

FIG. 2 illustrates an example partitioning of a high-dimensional input variable collection into subsets to be used for a plurality of machine learning models configured as a hierarchy, according to at least some embodiments. In the depicted embodiment, a collection of input variables (V1, V2, . . . , VN) or features 200 that have been identified as potentially being useful for a time-constrained machine learning application may be quite large. For example, for some sophisticated applications, hundreds or even thousands of variables or features may be used.

In a sub-optimal approach 205, all the input variables may be provided to a single complex machine learning model 214, as indicated by arrow 207, and the final machine learning result or prediction 233A may be obtained from that single model. This approach may be sub-optimal in several respects, compared to the optimized alternative approach 215—e.g., it may be harder to train the model, the quality of the predictions of the model may not be very high due to the high dimensionality of the input, more resources may have to be reserved for real-time analysis than desired, and so on.

In an optimized approach 215 which may be employed in at least some embodiments, the collection of input variables may be partitioned into subsets, with some subsets (such as subsets 250A and 250B) being provided as inputs to respective offline machine learning models 254A and 254B as indicated by arrows 257A and 257B. Each of the offline models 254 may have been developed or trained by experts in a particular sub-domain of the problem being addressed by the application—e.g., in the case of an e-retail application, model 257A may have been developed by a team associated with payment processing, model 257B may have been developed by a team responsible for credit-worthiness analysis, and so on. It is noted that although the input subsets 250A and 250B are shown as non-overlapping in FIG. 2, in some embodiments the intersections of the input subsets for the offline models may be non-empty, and/or the intersections of the offline and real-time subsets may be non-empty.

Individual ones of the offline models 254 may generate respective concise intermediate results or predictions 252 in the depicted embodiment—e.g., an intermediate result 252A may be produced by model 254A, another intermediate result 252B may be produced by model 254B, and so on. In at least some embodiments, the number of input variables consumed by the offline models may be quite large (e.g., hundreds or thousands of variables each), but the outputs may be quite small—e.g., a single scalar value such as a score or a classification result may be produced by a given offline model.

The intermediate results 252 may be combined with a remaining subset of input variables 260 (e.g., variables whose values are only available in real time, shortly before the final machine learning result is to be obtained) and provided as input to a real-time or online model 265, as indicated by arrow 258. The real-time model 265 may be considerably simpler and easier to train and execute than the single model 214, leading to lower resource requirements to obtain the final machine learning result 233B in the depicted embodiment.

It is noted that at least in some embodiments, respective offline models 254 may be run at different times (e.g., as soon as their input features/variables become available) during the course of an interaction session, and the corresponding intermediate results may therefore also be available at different times. As a result, the use of the hierarchical methodology may result in a more balanced distribution of the machine learning workload not only among different sets of computing devices (e.g., for respective models), but also a more even temporal distribution of computation, network and/or storage usage in at least some embodiments.

Example e-Retail Interaction Session Timeline

Figure 3:
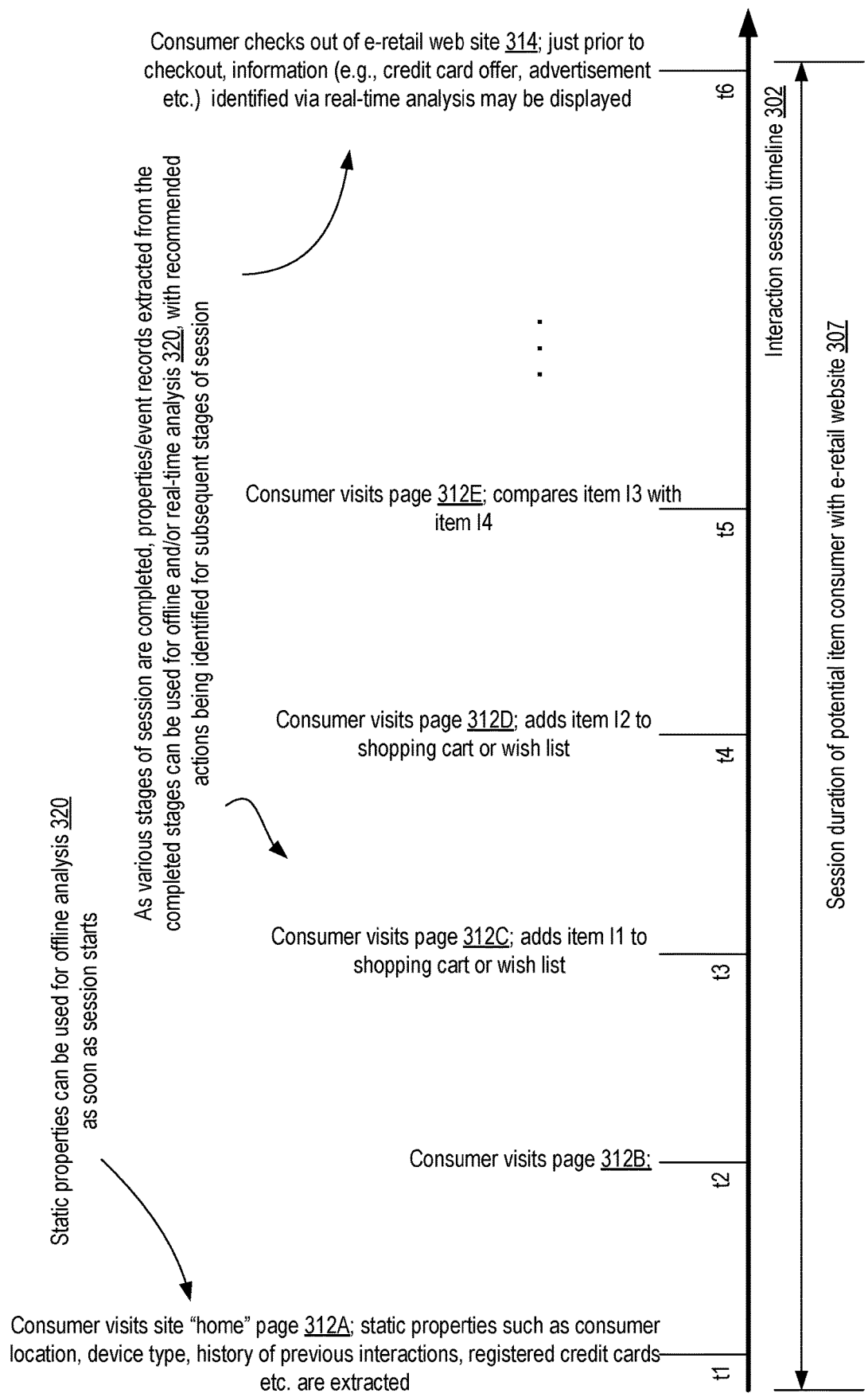
FIG. 3 illustrates an example timeline of a potential item consumer's interaction session with an e-retailing service at which hierarchical machine learning techniques may be used to optimize at least some interactions, according to at least some embodiments.

As mentioned earlier, in at least some embodiments, hierarchical machine learning may be employed to optimize aspects of an e-retailing service. FIG. 3 illustrates an example timeline of a potential item consumer's interaction session with an e-retailing service at which hierarchical machine learning techniques may be used to optimize at least some interactions, according to at least some embodiments. The duration 307 of an item consumer's session along timeline 302 may comprise occurrences of various events, at times t1, t2, t3, t4, t5 and t6 in the depicted example.

At time t1, the consumer may visit the e-retail site's home or landing page, as indicated in element 312A. Some number of static properties of the session may be detected as soon as, or very shortly after, the home page is accessed. For example, the network requests (e.g., requests formatted according to some version of the HyperText Transfer Protocol or HTTP) that led to the display of the home page may include information that can be used to determine the identity of the consumer, an approximate physical location of the consumer (based for example on a source IP address indicated in a request message) and various other types of information associated with the consumer. In at least some embodiments, the identity of the consumer may be used to obtain historical records of previous interaction sessions of the consumer with the service (e.g., which items the consumer has purchased earlier), membership information regarding the consumer (e.g., whether the consumer is a member of a preferred customer group of the e-retailer), the set of credit cards or other payment methods the consumer has used in previous interactions with the r-retailer, preferences of the consumer regarding various item categories, and so on. Such static properties may be used to initiate offline analysis 320 as soon as, or shortly after, the session starts in some embodiments. Some of the static properties may be ascertained at a real-time analysis subsystem and provided in a communication to an offline analysis subsystem in the depicted embodiment; other static properties may be obtained at the offline analysis subsystem using the session information provided by the real-time analysis subsystem. For example, the identity of the consumer, which may be indicated in a query sent to the offline analysis subsystem by the real-time analysis subsystem, may be used as a key to look up records of earlier interactions, payment methods, and so on. In at least one embodiment, the offline analysis subsystem(s) may simply use the static properties indicated by the real-time analysis subsystem, and may not necessarily query other systems to get values of additional offline variables.

At time t2 along timeline 302, the consumer may visit a web page 312B in the depicted example. At time t3, another page 312C may be visited, and an item I1 may be added to the consumer's shopping cart or wish list, while at time t4, another item I2 may be added to a shopping cart or wish list after visiting page 312D. At time t5, the consumer may visit another page 312E and issue a request to compare items I3 and I4. Each of these events may be recorded in some embodiments as a property of the session, and at least some of the records/properties may be used to help identify actions to be taken later on in the session. As indicated in element 320, properties or event records extracted from the currently-completed stages of the session may be used for offline and/or real-time analysis in the depicted embodiment, with recommended actions being identified for subsequent stages of the session. For example, the static properties and the records of events at times t2 and t3 may be used to predict that the consumer is likely to want to visit page 312D, so part of the content of page 312D may be fetched and cached to help improve the responsiveness of page 312D in some embodiments.

At time t6, the consumer may check out from the e-retailer's web site 314, thereby terminating the shopping session. Just prior to the checkout, targeted information (such as one or more credit card offers, advertisements, promotions and the like) identified using a real-time model may be displayed to the consumer in the depicted embodiment, The input provided to the real-time model may include, for example, intermediate results produced using offline analysis earlier in the session, as well as some real-time session properties ascertained shortly before the checkout event in various embodiments.

Hierarchical Machine Learning at Monitoring Systems

Figure 4:
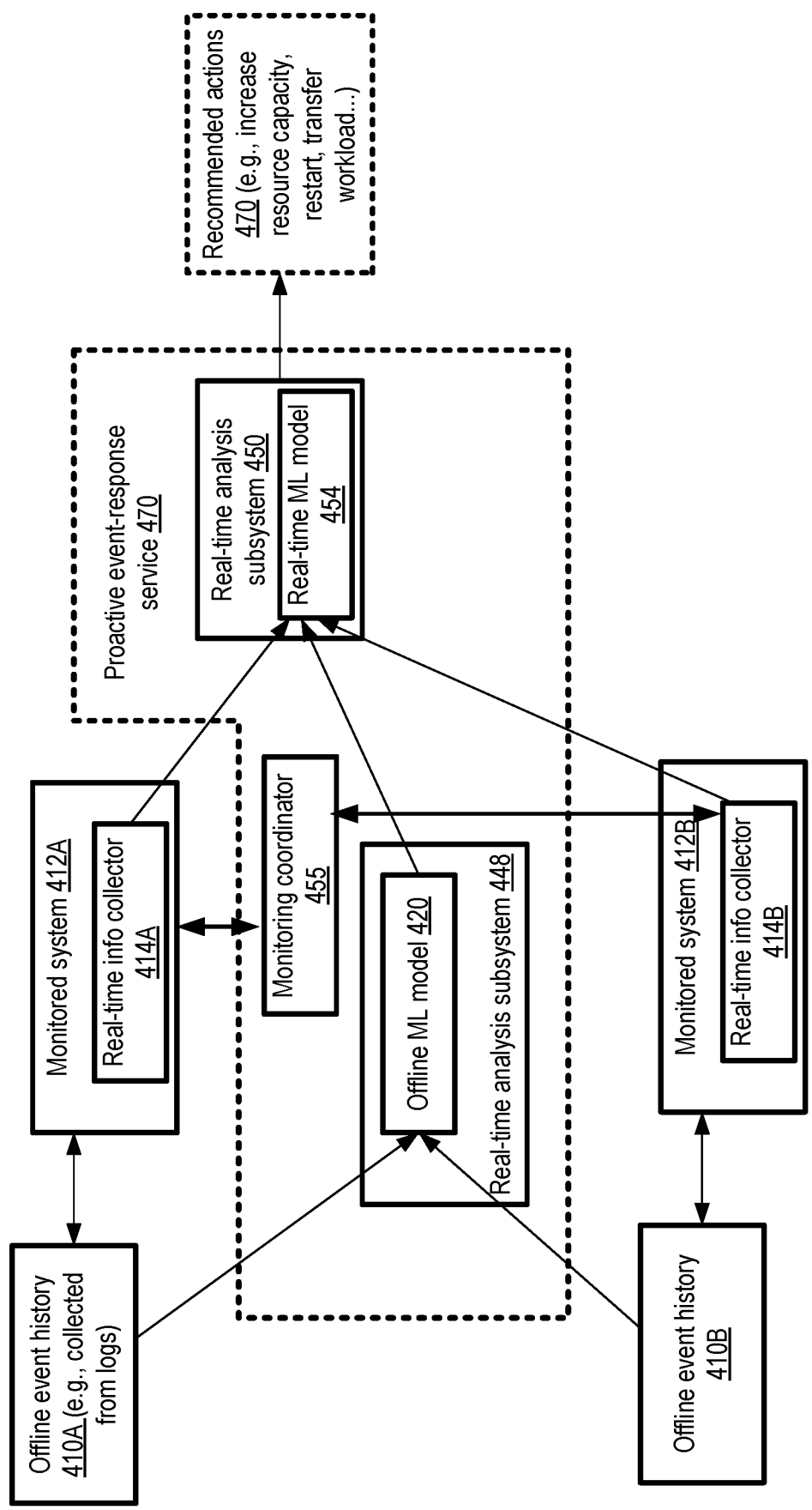
FIG. 4 illustrates an example scenario in which hierarchical machine learning techniques may be used to identify response actions to be taken with respect to one or more monitored systems, according to at least some embodiments.

In at least some embodiments, a hierarchy of machine learning models may be used to respond to various types of monitored events. FIG. 4 illustrates an example scenario in which hierarchical machine learning techniques may be used to identify response actions to be taken with respect to one or more monitored systems, according to at least some embodiments. In the depicted embodiment, a proactive event-response service may utilize machine learning models to determine actions to be taken with regard to one or more monitored systems, such as systems 412A and 412B. In some embodiments, the monitored systems 412 may comprise collections of computing hardware and software, while in other embodiment the monitored systems may comprise industrial equipment, transportation devices such as a fleet of automobiles, planes, trains, etc., and/or various other types of entities.

One or more monitoring coordinators 455 implemented at computing devices may be responsible for interacting with the monitored systems 412 in the depicted embodiment, e.g., instantiating respective real-time information collectors 414 (such as 414A and 414B) at the monitored devices and communicating with the information collectors 414 at various points in time during a monitoring session. Any of various modes of communicating with the monitored information may be used in various embodiments, including a pull mode in which the coordinator 455 periodically requests information about recent events or measurements from the information collectors 414, and a push mode in which the collectors 414 transmit data to the coordinator without prompting. Depending on the types of systems being monitored, the metrics or event records collected in real time may vary—e.g., from computing systems, measurements of CPU utilization levels, network usage, storage usage, number of concurrent processes/threads running, and so on, may be collected. In at least some embodiments, records of events such as memory allocations, process instantiations/terminations, file size thresholds being reached, and the like may also be obtained by the collectors 414 and provided to the proactive event-response service 470.

In at least some embodiments, respective offline event history records 410, such as 410A and 410B, comprising for example information collected over some time period from system logs associated with the monitored systems, may be available for analysis. Such offline records may be supplied as input to an offline machine learning model 420 of subsystem 448 in the depicted embodiment. Intermediate results produced by the offline model 420, such as for example a prediction regarding an anticipated workload level during some future time interval, or a prediction indicating the probability of some types of failure or overload event, may be included, together with information obtained from collectors 414, in the input data set of a real-time machine learning model 454 in the depicted embodiment. The output of the real-time model 450 may be used to select a recommended action 420 for one or more of the monitored systems 412 in various embodiments, such as increasing the resource capacity, restarting one or more processes/components, shifting or transferring workload from one monitored system to another, and so on.

Multi-Level Machine Learning Hierarchies

Figure 5:
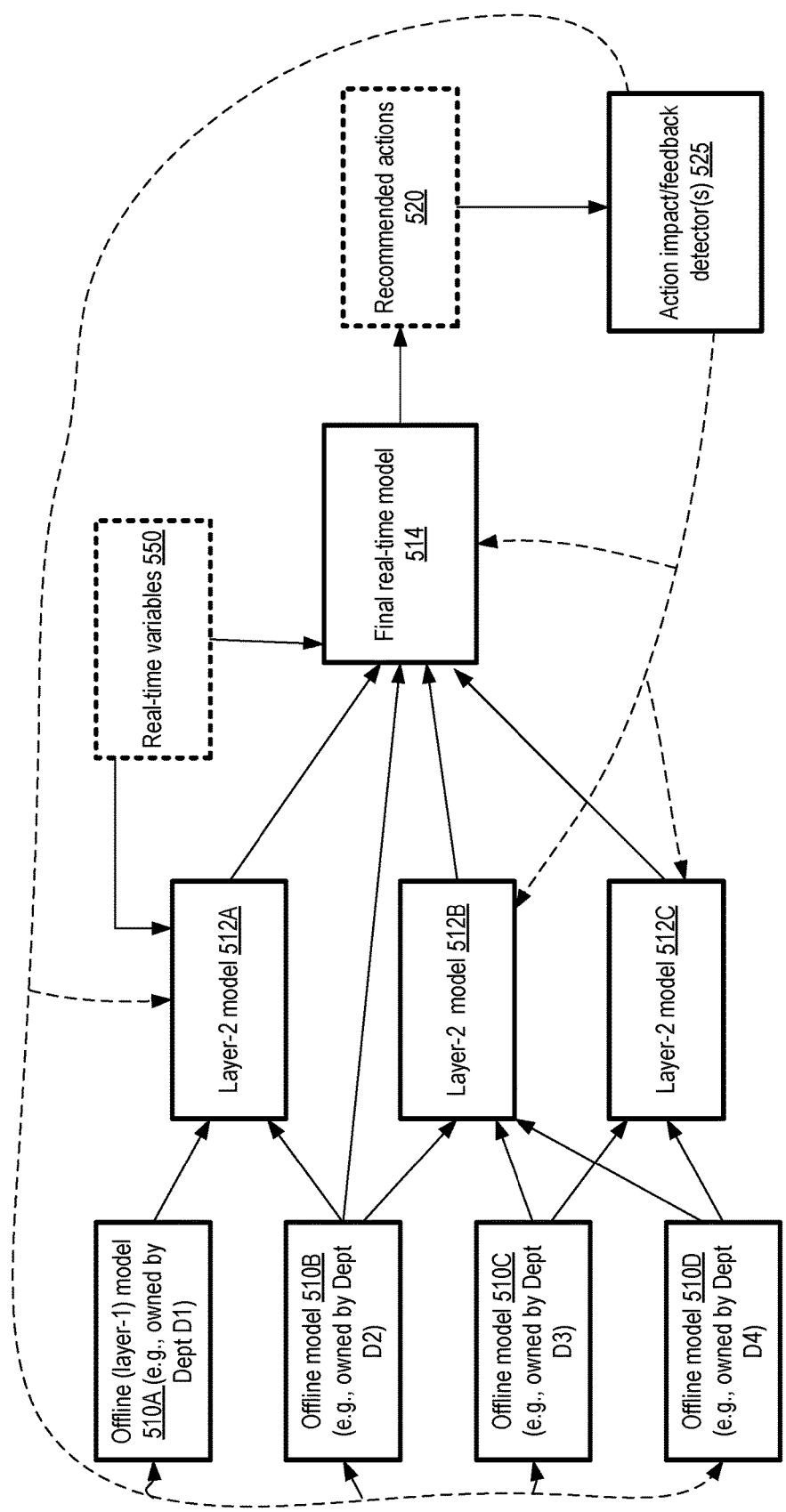
FIG. 5 illustrates an example multi-level hierarchy of machine learning models, according to at least some embodiments.

Depending on the complexity of the application for which machine learning is being employed, and/or on the number of different subsets into which the input variables identified for machine learning can be logically subdivided based on different domains of expertise, fairly complex hierarchies of models may be used in some embodiments. FIG. 5 illustrates an example multi-level hierarchy of machine learning models, according to at least some embodiments. In the depicted embodiment, four different offline models 510A —510D, each respectively owned/trained by a respective department D1 through D4 of some organization, may be employed. The departments D1-D4 may comprise experts in respective sub-domains of the subject matter of the application, and may thus be able to generate relatively independent models associated with each sub-domain.

Outputs generated by the offline models 510 may be combined in various ways and provided as inputs to other models in the depicted embodiment. For example, an intermediate or layer-2 model 512A may consume output from offline models 510A and 510B, a second layer-2 model 512B may consume output generated by offline models 510B, 510C and 510D, while a third layer-2 model 512C may consume input from offline models 510C and 510D in the example scenario shown. In some cases, as in the case of layer-2 model 512A, at least a subset of real-time variables 550 may also be included in the input of the intermediate models. The input data set of a final real-time model 514 may comprise, for example, a set of real-time variables 550 as well as output generated by models 512A, 512B, 512C and 510B. The output of the final real-time model 514 may indicate one or more recommended actions 520 for a given combination of input values. In general, the hierarchy may comprise any desired number of layers of models in different embodiments, with various combinations of outputs from models at various layers being included in the inputs at other layers.

In various embodiments, one or more action feedback or impact detectors 525 may collect data indicating the extent to which the recommended actions 510 were successful in achieving desired goals of the application for which the machine learning models were used. The factors contributing to the success or failure may of course be application-specific. For example, in a scenario in which hierarchical machine learning models are used to select targeted advertisements to be displayed as a potential item consumer navigates an e-retail web site, the success of the actions taken may be measured in terms of the ratio of times that the advertised items were examined or purchased, to the ratio of time the advertisements were shown. The feedback may be used to modify/enhance models at various levels of the hierarchy in at least some embodiments, as indicated by the dashed arrows in FIG. 5.

Figure 6:
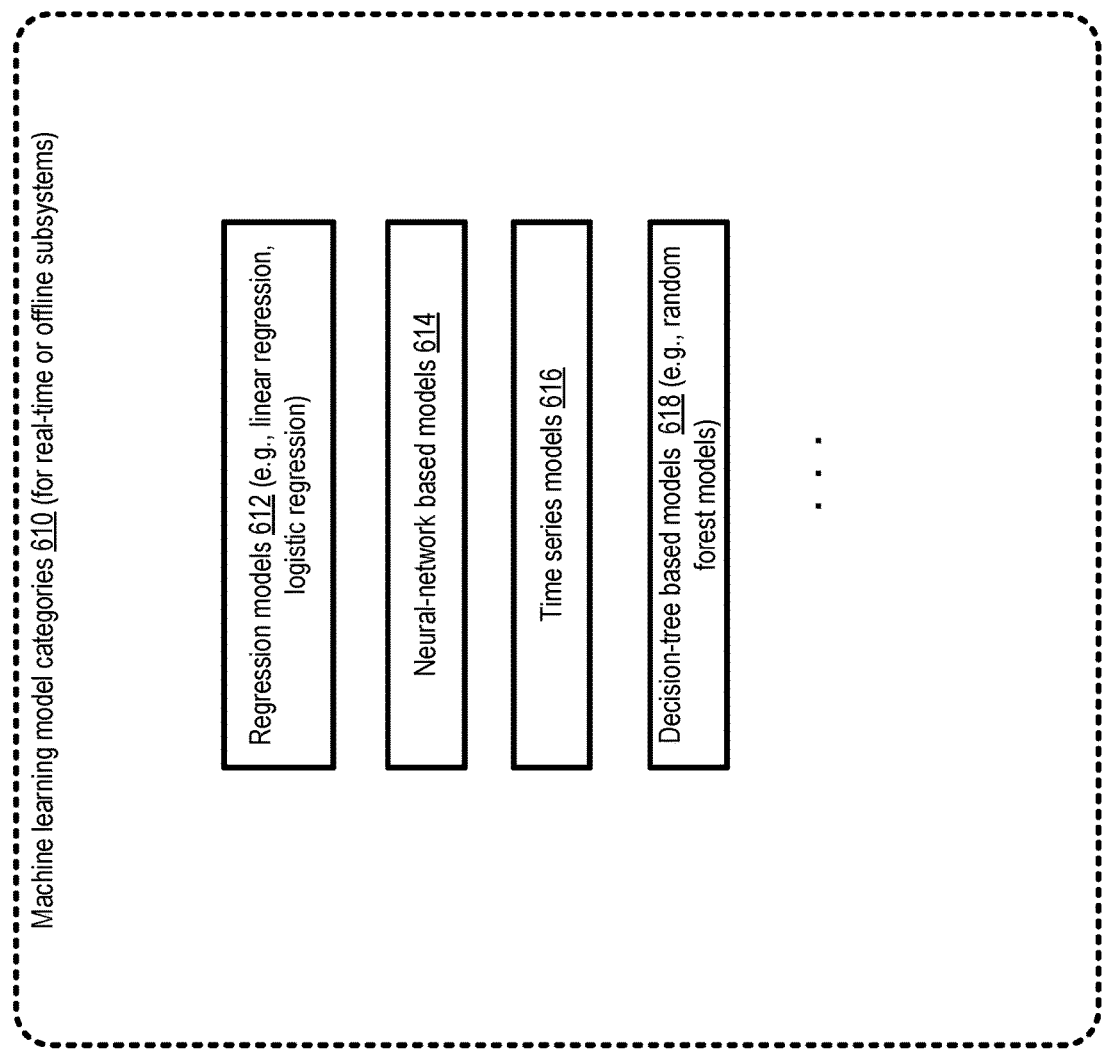
FIG. 6 illustrates examples of categories of machine learning models which may be employed in hierarchical machine learning applications, according to at least some embodiments.

FIG. 6 illustrates examples of categories of machine learning models which may be employed in hierarchical machine learning applications, according to at least some embodiments. As shown, a wide variety of model and algorithm categories 610 may be used at any of the different layers of a hierarchy, including for example regression models 612 (e.g., linear regression or logistic regression models), neural network based models 614, time series models 616, and/or decision tree based models 618 (such as random forest models, classification and regression trees or CART models and the like).

In at least some embodiments, the types of models used at the offline analysis subsystem (or intermediate layers in the case of a multi-layer hierarchy of the kind shown in FIG. 5) may differ from the types of models used at the real-time analysis subsystem. For example, in one embodiment, neural network-based models may be used for at least a portion of the offline analysis, while a regression model may be used for real-time analysis. Even within a given layer, different types of models may be employed in some embodiments—e.g., if three different offline models are used for some application, one may be a regression model, another may be a neural network model, while a third may be a time series model. In some embodiments, multiple models (potentially of different types) may be employed at the real-time analysis subsystem, e.g., with the results produced by the different real-time models being aggregated or combined to identify recommended actions. Other types of models may be used in some embodiments than those shown in FIG. 6.

Conditional Execution of Machine Learning Models

Figure 7:
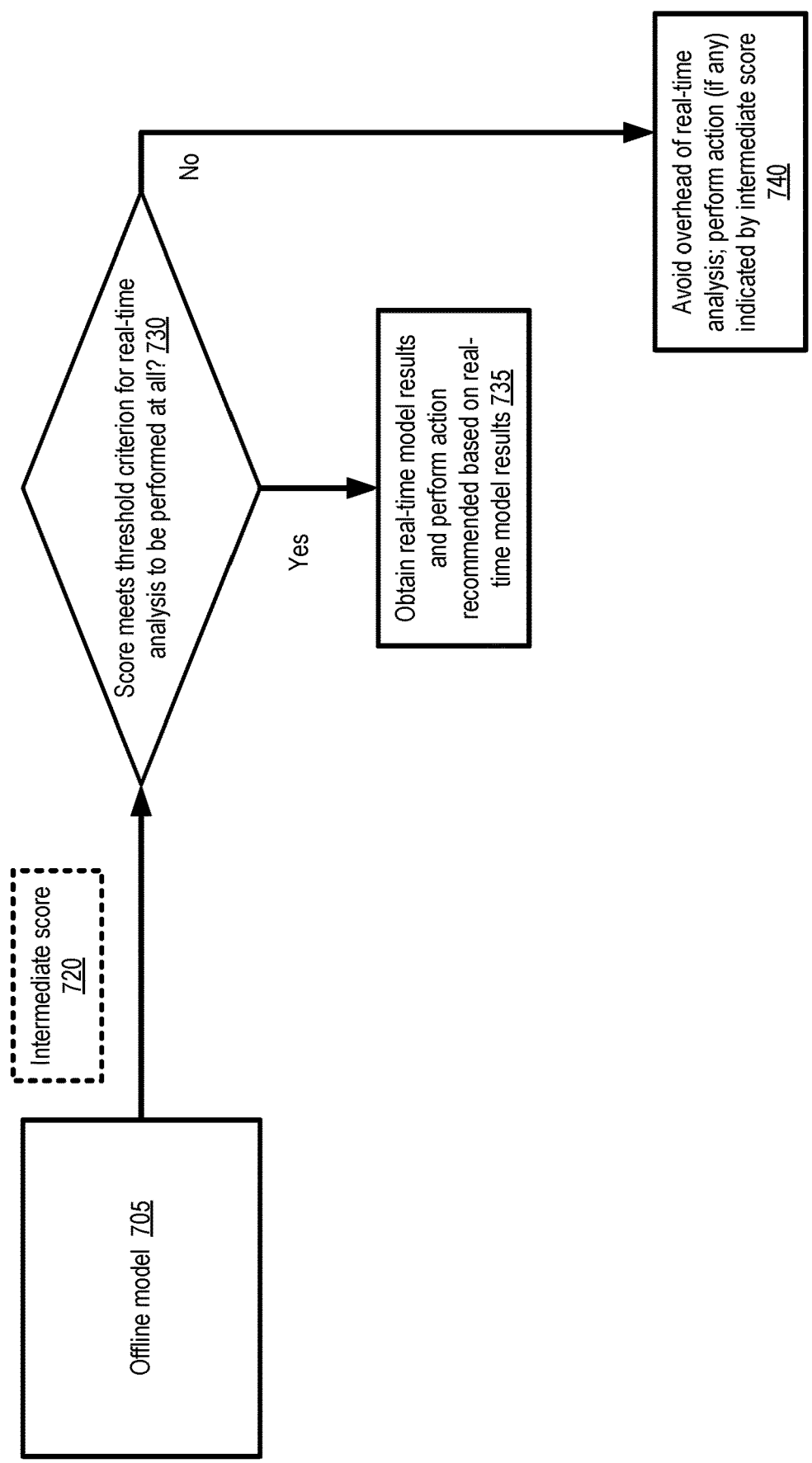
FIG. 7 illustrates an example scenario in which the results obtained from an offline machine learning model may be used to decide whether a real-time machine learning model is to be executed, according to at least some embodiments.

In some embodiments, the use of offline models may help to reduce resource consumption of the real-time analysis subsystems, e.g., by avoiding running the real-time models entirely for some input observations. FIG. 7 illustrates an example scenario in which the results obtained from an offline machine learning model may be used to decide whether a real-time machine learning model is to be executed, according to at least some embodiments.

In the depicted embodiment, a threshold value may be selected for an intermediate score 720 produced by an offline model, and the real-time portion of the analysis may only be performed if the intermediate score meets a criterion defined in terms of the threshold. Consider a simplified example scenario in which, roughly speaking, 80% of the information that is to be used to recommend an action is available using the offline subset of input variables, and the remaining 20% of the information can be extracted from a real-time subset of input variables. It is noted that in practice, such clear-cut distinctions about how much information respective subsets of input variables can provide regarding action recommendations may not often be possible; the example is discussed here to help explain the concept of conditional execution of some models of a hierarchy. Extending the example further, assume that the decision to be made using the combination of offline and real-time analysis is a binary one: whether, for a given input example, action A1 is to be taken, or not. Assume also that A1 is to be implemented if and only if the final score generated by the hierarchy of models exceeds 0.5 (and that the values of the final score can lie between 0 and 1).

If the intermediate score 720 for a given input example E1 is, say, 0.3, and only 20% of the final score can be affected by the real-time analysis (since 80% of the final score is determinable at the offline analysis subsystem), then the maximum score that could be obtained if the real-time model were run would be 0.3×1.2 or 0.36 in this example. Since 0.36 is less than 0.5 (the decision threshold for A1), there is no need to run the real-time model at all for input example E1; A1 would not be recommended or implemented for the input example E1. This may result in reducing resource usage at the real-time analysis subsystem. In effect, if much of the decision-making logic can be offloaded to the offline analysis subsystem, it may be possible to conserve constrained real-time analysis resources for the more difficult cases (i.e., for cases where the decision does in fact depend to a significant extent on the values of the real-time variables). As shown in element 730 of FIG. 7, if the intermediate score 720 fails to meet a threshold criterion for an input example, the overhead of real-time analysis may be avoided entirely, as indicated in element 740. As mentioned in the context of FIG. 1, in some embodiments operations performed at a real-time analysis subsystem may comprise invoking functionality of an external data source or service. The work associated with such invocations may represent one example of the kind of overhead that may be avoided based on the analysis of the intermediate score 720 in some embodiments. If an action is indicated by the intermediate score itself, that action may be taken. Of course, if the threshold criterion is met, real-time model results may be obtained (element 735) and the recommended action identified using results of the real-time execution may be performed.

Hierarchical Machine Learning Using Provider Network Resources

Figure 8:
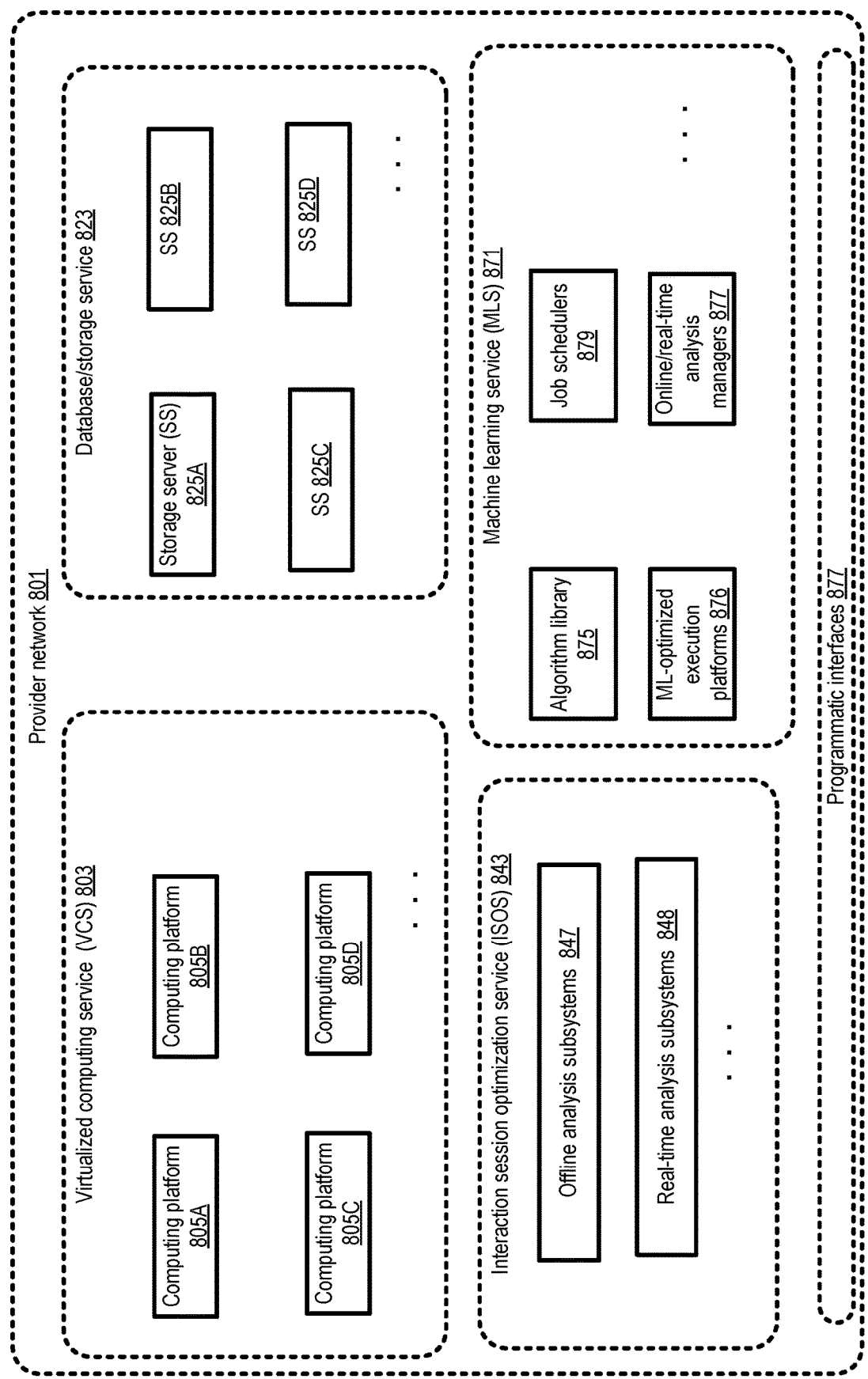
FIG. 8 illustrates a provider network environment at which an interaction session optimization service employing hierarchical machine learning techniques may be implemented, according to at least some embodiments.

In some embodiments, the techniques discussed above for hierarchical machine learning may be implemented using resources of one or more services of a provider network. FIG. 8 illustrates a provider network environment at which an interaction session optimization service employing hierarchical machine learning techniques may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

In the depicted embodiment, provider network 801 may comprise resources used to implement a plurality of services, including for example a virtual computing service 803, a database or storage service 823, a machine learning service 871 and an interaction session optimization service (ISOS) 843. In some embodiments, the ISOS 843 may be implemented as part of the machine learning service 871; in other embodiments, the ISOS may be implemented as a separate service of the provider network as shown. Components of a given service may utilize components of other services in the depicted embodiment—e.g., for some machine learning tasks, a component of the machine learning service 871 may utilize virtual machines implemented at computing platforms such as 805A-805D of the virtualized computing service. Input data, intermediate results, final results and/or other artifacts of various machine learning algorithms or models may be stored at storage servers 825 (e.g., 825A-825D) of the database or storage service 823 in some embodiments. Individual ones of the services shown in FIG. 8 may implement a respective set of programmatic interfaces 877 which can be used by external and/or internal clients (where the internal clients may comprise components of other services) in the depicted embodiment.

As shown, the interaction session optimization service 843 may comprise, among other components, one or more offline analysis subsystems 847 and one or more real-time analysis subsystems 848 in the depicted embodiment. Either type of subsystem 847 or 848 may invoke algorithms selected from the machine learning algorithm library 875 to collectively generate recommendations for actions to be taken, for example, to optimize presentation of information at various stages of interaction sessions in the depicted embodiment. In one embodiment, respective offline and real-time analysis subsystems may be established for each of a plurality of applications, such as an e-retailing application, a system monitoring application and the like; in other embodiments, the same offline analysis subsystem may be used for multiple applications, or the same real-time analysis subsystem may be used for multiple applications. In some embodiments, requests to train machine learning models (including offline models, for example) may be handled as batch jobs at the machine learning service, and a batch job scheduler 879 may orchestrate the allocation of resources for the jobs as well as dependencies among jobs. In some embodiments, the MLS 871 may comprise online/real-time analysis managers 877, e.g., to orchestrate small tasks, and such resources may be used for real-time analysis tasks. In at least one embodiment, a machine learning service 871 may have access to or include a set of execution platforms 876 that are optimized for machine learning tasks (e.g., platforms that have customized hardware such as GPU arrays and/or customized software stacks). Depending on the suitability of such platforms for the models used at various levels of the hierarchy, one or more execution platforms 876 may be employed in the depicted embodiment.

In at least some embodiments, the tasks of generating recommended actions using a hierarchy of models of the kinds discussed earlier may be accomplished using non-specialized computing platforms of the virtualized computing service. In various embodiments, the training and test/evaluation data used for models at various levels of a hierarchy may be stored at a database/storage service 823. Techniques for generating action recommendations using hierarchically organized machine learning models as described above may be implemented without acquiring resources of network-accessible services such as those shown in FIG. 8 in at least some embodiments. For example, a standalone set of one or more computing devices which are not part of a network-accessible service may be used in some embodiments.

Figure 9:
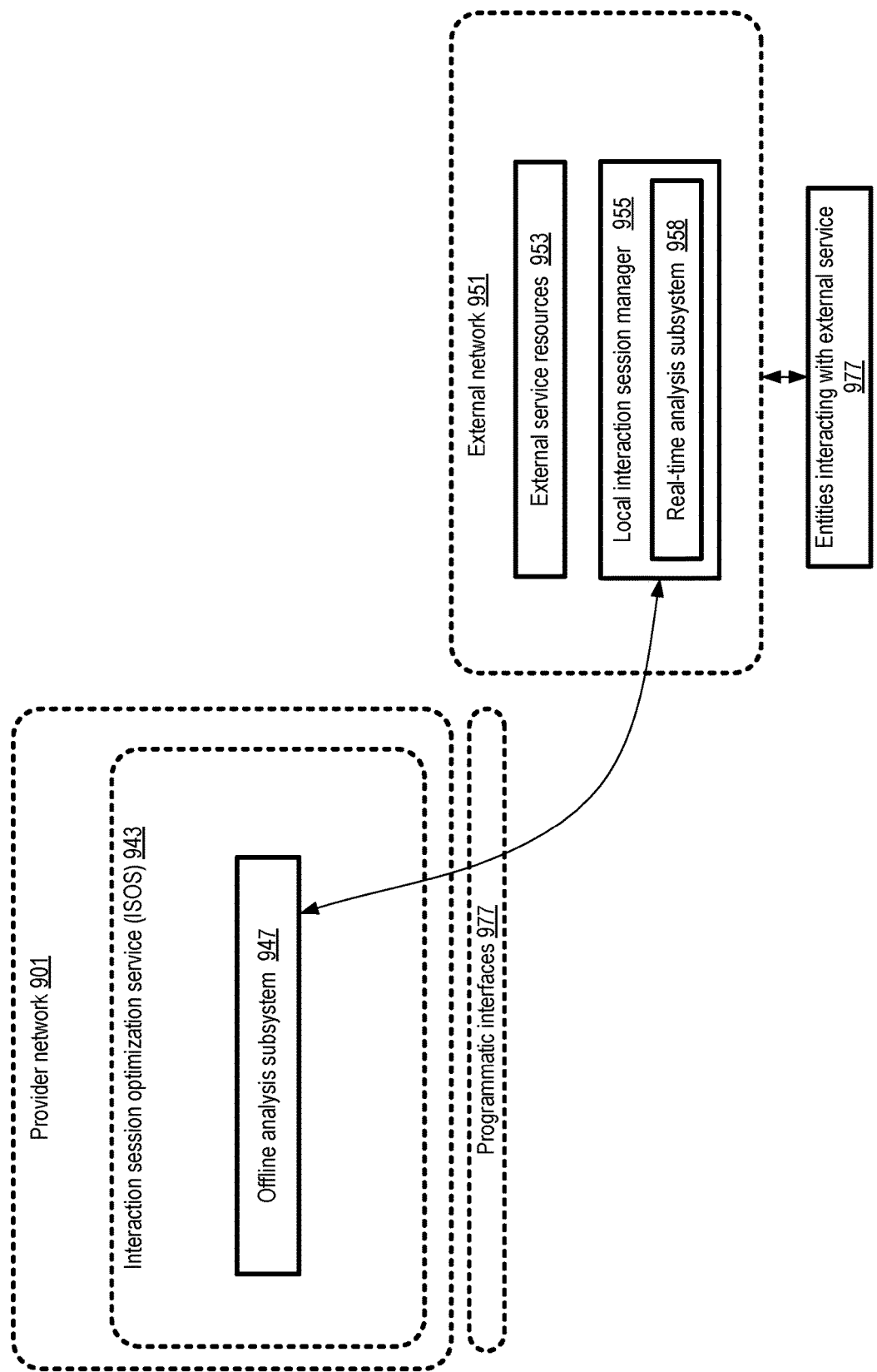
FIG. 9 illustrates an example scenario in which offline machine learning models implemented within a provider network may be utilized for optimization at a network external to the provider network, according to at least some embodiments.

FIG. 9 illustrates an example scenario in which offline machine learning models implemented within a provider network may be utilized for optimization at a network external to the provider network, according to at least some embodiments. In the depicted embodiment, a service may be provided to a set of entities 977 using at least some resources 953 external to a provider network; such a service may be referred to as an external service with respect to the provider network. For example, an e-retailer may implement one or more web sites at an external network 951, comprising a set of hardware and software components located at a data center which is not part of the provider network's data centers.

The task of optimizing presentation of information during clients' interaction sessions with the external service may be split into two types of operations, performed at least in part using resources of different networks, in the depicted embodiment. A local interaction session manager 955 within the external network 951 may utilize an offline analysis subsystem 947 of a session optimization service 943 within the provider network and a real-time analysis subsystem 958 within the external network itself. A subset of properties of the session, e.g., including one or more static properties, may be provided in a query directed to offline analysis subsystem 947 by the session manager, and used as input for an offline machine learning model. An intermediate result of that offline model may then be combined, in the input provided to a real-time model at a real-time analysis subsystem 958, with one or more real-time properties of the session. The final result of the real-time model may then be used to identify a recommended action to be taken to optimize a future stage of the session in various embodiments. The offline machine learning model may have been trained and run using the algorithms and extensive machine learning resources (such as those discussed in the context of FIG. 8) available at the provider network, thereby reducing the need for machine learning resources at the external network 951. In effect, a substantial fraction of the work associated with identifying optimization actions for the session may be performed using provider network resources and expertise, with only a small fraction of the work having to be performed at the external network. Furthermore, because of the availability of greater computing capacity at the provider network, in at least some embodiments the overall time taken to obtain the final optimization results may be reduced relative to the time it may have taken if all the machine learning work were performed at the external network.

Methods for Hierarchical Machine Learning

Figure 10:
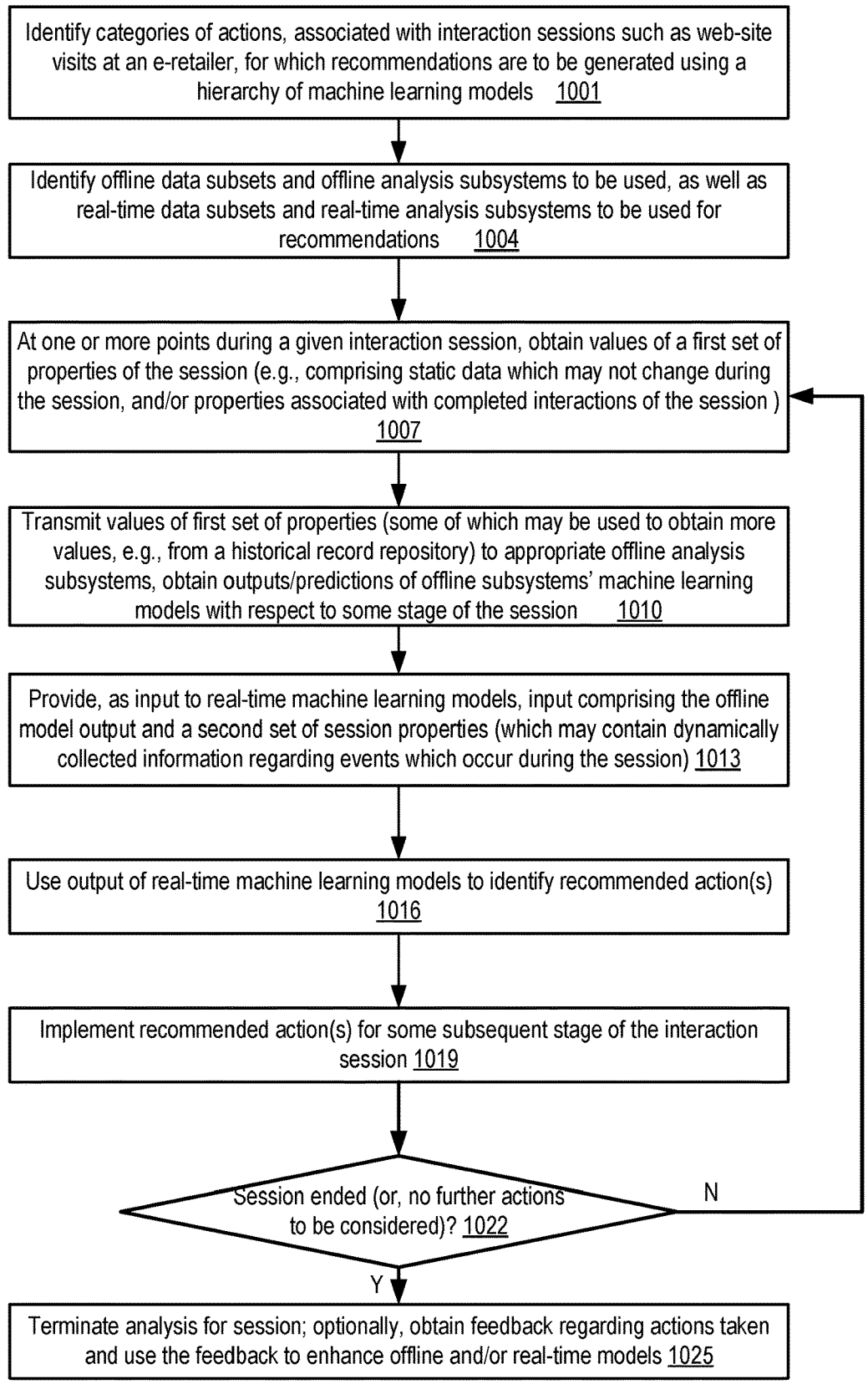
FIG. 10 is a flow diagram illustrating aspects of operations that may be performed using a hierarchy of machine learning models, according to at least some embodiments.

FIG. 10 is a flow diagram illustrating aspects of operations that may be performed using a hierarchy of machine learning models, according to at least some embodiments. As shown in element 1001, one or more categories of actions, associated with an application comprising interaction sessions such as web-site visits at an e-retailer, for which recommendations are to be generated using a hierarchy of machine learning models may be identified in the depicted embodiment, e.g., at one or more computing devices of a session optimization service implemented at a provider network.

A set of one or more offline data subsets and corresponding offline analysis subsystems to be used, as well as one or more real-time data subsets and real-time analysis subsystems to be used for generating recommendations may be identified in various embodiments (element 1004). In at least some embodiments, such subsystems may be implemented by different teams or groups of a large organization, where individual teams may comprise experts in various sub-aspects of the problem domain being addresses by the application for which recommendations are to be generated. Each subsystem may comprise one or more machine learning models of any of the various types discussed earlier in various embodiments. In at least some embodiments, the training of the models of the different subsystems may be performed at least partly independently (and at least in some cases in parallel). In effect, a fleet of relatively small (and therefore more quickly trainable) high-quality machine learning models addressing different aspects of the application may be trained instead of a single large model. Connectivity channels may be established between the different subsystems, for example enabling queries to be submitted from a real-time analysis subsystem to each of one or more offline analysis subsystem.

At one or more points during a given interaction session, values of a first set of properties of the session (e.g., comprising static information which may not change during the session, and/or properties associated with completed interactions of the session) may be identified in the depicted embodiment (element 1007). Static data may, for example, include information identifying an entity participating in the session, a location or network address of the entity, and so on.

Values of the first set of properties (some of which may be used to obtain more input values for offline models, e.g., from a historical record repository) may be transmitted to the appropriate offline analysis subsystems (element 1010) in various embodiments. A first set of machine learning models may be executed at the offline analysis subsystems in various embodiments using the provided session property values (and/or additional inputs obtained using the provided values) as inputs, and intermediate outputs/predictions with respect to some stage of the session may be obtained at the offline analysis subsystems.

An input data set for one or more real-time machine learning models may be constructed using the intermediate results generated at the offline analysis subsystems, as well as additional real-time properties of the session (element 1013) in various embodiments. The real-time input variables may, for example, comprise dynamically collected information regarding events which occur during the session, some of which may have occurred after at least some of the offline analysis was initiated.

One or more recommended action(s) may be identified based at least in part on the output of the real-time machine learning models in the depicted embodiment (element 1016). In an example scenario in which an e-retailing interaction session is being optimized, the action may for example, comprise adding a particular promotional offer to a display of a checkout page, adding a targeted advertisement, etc. The recommended action(s) may be implemented for one or more subsequent stages of the interaction session in various embodiments (element 1019).

If the session is ended, or a decision is made that no further optimization is to be performed for the session (as determined in element 1022), the analysis for the session may be terminated (element 1025). In some embodiments, feedback regarding the impact of the recommended actions may be collected and used to enhance the offline and/or real-time models over time. If further stages of the session remain to be analyzed, operations corresponding to elements 1007 onwards may be repeated.

It is noted that in various embodiments, some of the operations shown in the flow diagram of FIG. 10 may be implemented in a different order than that shown in the figure, or may be performed in parallel rather than sequentially. Additionally, some of the operations shown in FIG. 10 may not be required in one or more implementations.

Use Cases

The techniques described above, of distributing the work required to optimize service interactions sessions using a hierarchy of machine learning resources distributed among offline and real-time analysis subsystems may be useful in a variety of environments. For some applications, as in the case of e-retail applications, decisions regarding the presentation of appropriate content or promotional information may have to be made within very short intervals, and the quality of such decisions may depend upon the analysis of a large number of variables. In many cases, it may be possible to subdivide the complete set of variables of interest into subsets, including some subsets whose variable values can be ascertained relatively earlier during the course of an interaction session than others. By processing the different sets of variables separately, it may be possible to reduce the total amount of computation that has to be performed immediately prior to making the presentation decisions. Furthermore, by producing concise intermediate results using the subsets whose variable values can be obtained early, and transmitting such results for use in the real-time stage of the analysis, the number of bytes transferred over networks to the real-time subsystems may be reduced, and the amount of storage needed at the real-time subsystems may also be reduced. The user experience afforded to the end-users of the applications may be significantly improved by the speed at which the decisions can be made as a result of using the hierarchical approach. Furthermore, because the overall machine learning problem is subdivided, with respective sub-problems being handled by models trained with the help of subject matter experts in respective sub-domains, the overall quality of the decisions made may also be enhanced substantially. Because at least some of the models can potentially be trained in parallel, and may have low input dimensionality, the overall model training time may also be reduced, e.g., compared to a scenario in which a single large model is trained. Similar benefits may be achieved in various problems domains other than e-retail, such as system monitoring and the like.

Illustrative Computer System

Figure 11:
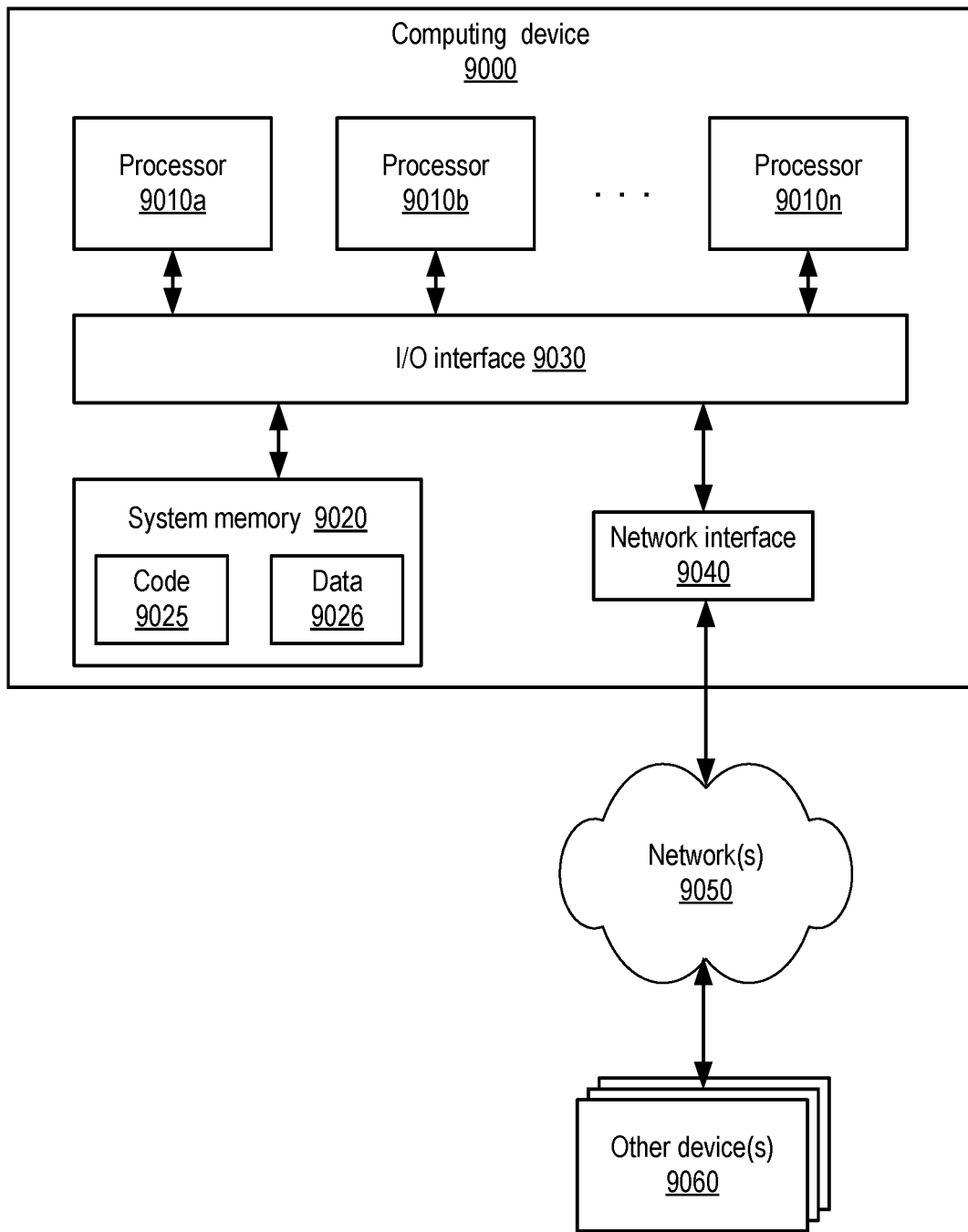
FIG. 11 is a block diagram illustrating an example computing device that may be used in at least some embodiments.

In at least some embodiments, a server that implements a portion or all of one or more of the technologies described herein, including the training and execution of machine learning models for the optimization of various stages of interaction sessions, may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAIVI), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of an artificial intelligence service for optimizing interaction sessions;
wherein the one or more computing devices are configured to:
obtain, from a first machine learning model whose input data set comprises respective values of at least a subset of a first set of properties of an interaction session of a first entity with a network-accessible service, wherein the first set comprises at least one property which remains unchanged during the first interaction session, an intermediate result pertaining to at least one stage of the interaction session;
provide, as input to a second machine learning model of a real-time analysis subsystem, at least (a) the intermediate result obtained from the first machine learning model and (b) respective values of a second set of properties of the interaction session, wherein the second set of properties comprises a record of an occurrence of an event in the interaction session; and cause, in a particular stage of the interaction session, a particular action recommended by the real-time analysis subsystem to be implemented, wherein the particular action is based at least in part on output generated by the second machine learning model.

2. The system as recited in claim 1, wherein the interaction session comprises an interaction via one or more programmatic interfaces between a potential item consumer and an e-retail service providing access to a plurality of items.

3. The system as recited in claim 1, wherein the particular stage of the interaction session comprises a checkout stage of a shopping interaction session with an e-retail web site.

4. The system as recited in claim 1, wherein a first action of the action recommendation comprises one or more of: (a) presenting a promotional offer, (b) presenting an advertisement for a particular item or (c) pre-loading content to be displayed.

5. The system as recited in claim 1, wherein an input data set of the first machine learning model comprises one or more of: (a) an indication of an identity of an individual participating in the interaction session, (b) an indication of location information of an individual participating in the interaction session, or (c) one or more records of previous interactions of the entity with the network-accessible service.

6. A method, comprising:

performing, by one or more computing devices:

obtaining, from a first machine learning model whose input data set comprises values of a first set of one or more properties of a first interaction session between an entity and a network-accessible service, a first intermediate result pertaining to at least one stage of the first interaction session;

providing, as input to a second machine learning model, at least (a) the first intermediate result and (b) a second set of one or more properties of the first interaction session; and causing, in a particular stage of the interaction session, a particular action recommendation to be implemented, wherein the particular action recommendation is based at least in part on output generated by the second machine learning model.

7. The method as recited in claim 6, wherein at least one model of the first and second machine learning models comprises one or more of: (a) a regression model, (b) a decision-tree based model, (c) a neural network model or (d) a time-series model.

8. The method as recited in claim 6, the first interaction session comprises an interaction session via one or more programmatic interfaces between a potential item consumer and an e-retail service providing access to a plurality of items.

9. The method as recited in claim 6, wherein the particular stage of the interaction session comprises a checkout stage of a shopping interaction session.

10. The method as recited in claim 6, wherein a first action of the action recommendation comprises one or more of: (a) presenting a promotional offer, (b) presenting an advertisement for a particular item or (c) pre-loading content to be displayed.

11. The method as recited in claim 6, wherein the input data set of the first machine learning model comprises one or more of: (a) an indication of an identity of an individual participating in the interaction session, (b) an indication of location information of an individual participating in the interaction session, or (c) one or more records of previous interactions of the entity with the network-accessible service.

12. The method as recited in claim 6, wherein the second set of properties comprises a record of one or more of: (a) an insertion of an item into a shopping cart, (b) an insertion of an item into a wish list, or (c) a navigation to a particular portion of a web site.

13. The method as recited in claim 6, wherein the first intermediate result comprises a score indicative of a probability that the entity will (a) navigate to a particular portion of a web site or (b) purchase one or more items.

14. The method as recited in claim 6, wherein the input to the second machine learning model comprises an intermediate result generated by a third machine learning model.

15. The method as recited in claim 6, further comprising performing, by the one or more computing devices:

obtaining, from a repository, a historical record associated with another interaction session of the entity, wherein the input data set of the first machine learning model comprises the historical record.

16. A non-transitory computer-accessible storage medium storing program instructions that when executed on one or more processors cause the one or more processors to:

obtain a first intermediate result from a first machine learning model whose input data set comprises values of a first set of one or more properties associated with a session, wherein the session comprises a plurality of operations;

provide, as input to a second machine learning model, at least (a) the first intermediate result and (b) a second set of one or more properties associated with the session, wherein a value of at least one property of the first set is determined before a value of at least one property of the second set is determined; and cause a particular action recommendation pertaining to the session to be implemented, wherein the particular action recommendation is based at least in part on output generated by the second machine learning model.

17. The non-transitory computer-accessible storage medium as recited in claim 16, wherein the session comprises monitoring of one or more metrics of a system, wherein the first set of one or more properties comprises one or more historical records of events that have occurred at the system, wherein the first intermediate result comprises an indication of a predicted workload of the system, wherein the second set of one or more properties includes a collected value of a particular metric, and wherein the recommended action comprises changing a resource capacity.

18. The non-transitory computer-accessible storage medium as recited in claim 16, wherein the session comprises an interaction session via one or more programmatic interfaces between a potential item consumer and an e-retail service providing access to a plurality of items.

19. The non-transitory computer-accessible storage medium as recited in claim 16, wherein the input data set of the first machine learning model comprises one or more of: (a) an indication of an identity of an individual participating in the interaction session, (b) an indication of location information of an individual participating in the interaction session, or (c) one or more records of previous interactions of the entity with the network-accessible service.

20. The non-transitory computer-accessible storage medium as recited in claim 16, wherein the instructions when executed on the one or more processors cause the one or more processors to:

in response to a determination that a request has been received via a programmatic interface, cause one or more of: (a) the first intermediate result to be transmitted to a destination associated with the request or (b) output generated by the second machine learning model to be transmitted to a destination associated with the request.

\* \* \* \* \*